United States Patent [19]

Cohen et al.

[11] Patent Number: 5,384,635
[45] Date of Patent: Jan. 24, 1995

[54] REMOTE SENSING IN OPTICAL FIBER NETWORKS BY SYNCHRONOUSLY DETECTING BACKSCATTERED OPTICAL SIGNALS

[75] Inventors: Leonard G. Cohen, Berkeley Heights; Adolph H. Moesle, Jr., Murray Hill, both of N.J.; Ashish M. Vengsarker, Allentown, Pa.

[73] Assignee: AT&T Corp., Murray Hill, N.J.

[21] Appl. No.: 104,837

[22] Filed: Aug. 10, 1993

[51] Int. Cl.⁶ .................... G01N 21/84; G01N 21/21
[52] U.S. Cl. .................. 356/73.1; 250/227.17; 250/227.21
[58] Field of Search .............. 356/73.1; 250/227.17, 250/227.21

[56] References Cited

U.S. PATENT DOCUMENTS 4,904,863 2/1990 McDearmon .............. 250/227.17

FOREIGN PATENT DOCUMENTS 61-148332 7/1986 Japan ........................ 356/73.1
2243908 11/1991 United Kingdom ......... 356/73.1

OTHER PUBLICATIONS

A. J. Rogers, "Polarization-Optical Time Domain Reflectometry: A Technique for the Measurement of Field Distributions", Mar. 15, 1981, pp. 1060-1074, Applied Optics, vol. 20, No. 6.

Primary Examiner—Vincent P. McGraw

[57] ABSTRACT

The occurrence and location of a disturbance in the vicinity of a localized portion of an optical fiber are determined based on the recognition that such a disturbance changes the polarization condition of signals backscattered from the disturbed portion. Thus, multiple consistently polarized optical pulses are applied to an input end of the fiber and only signals of a particular polarization that are backscattered from the disturbed portion are abstracted from the input end. An output signal indicative of the disturbance is generated by processing these backscattered signals in accordance with synchronous detection techniques.

14 Claims, 3 Drawing Sheets

REMOTE SENSING IN OPTICAL FIBER NETWORKS BY SYNCHRONOUSLY DETECTING BACKSCATTERED OPTICAL SIGNALS

BACKGROUND OF THE INVENTION

This invention relates to optical fiber networks and, more particularly, to remotely sensing the occurrence and determining the location of a cyclic disturbance that affects a localized portion of an optical fiber included in such a network.

As the use of optical fibers in communications systems continues to grow, it is becoming increasingly important that reliable low-cost techniques be available for monitoring the condition of the fibers. Thus, for example, during installation of a fiber, testing is carried out to ensure that splices and connectors have low loss, that excessive losses have not been introduced due to bending or stressing of the fiber, and that the total end-to-end loss of the fiber is within prescribed specifications. Further, during actual operation of an installed fiber, regular checking is typically carried out to determine whether or not some degradation in the condition of the fiber has occurred. And, if the fiber is found to be impaired (accidentally cut, for example) it is important to be able to quickly and inexpensively ascertain the location of the impairment.

It is well known that information concerning the condition of an optical fiber can be obtained by repetitively launching optical pulses into one end of the fiber and then analyzing light that is backscattered from the fiber. This conventional single-ended technique, known as optical time domain reflectometry (OTDR), is well established as a useful tool for monitoring optical fiber networks.

Standard OTDR techniques make use of the information contained in the overall intensity of the backscattered light from an optical fiber to locate, for example, bad fiber-to-fiber joints and anomalously lossy sections of the fiber. It has also been recognized that there are many external influences (magnetic field, electric field, stress, strain, temperature, etc.) which act to change the polarization state of the light propagating in the fiber. Polarization state can be determined with an OTDR system modified to be polarization sensitive. (See, for example, "Polarization-Optical Time Domain Reflectometry: A Technique for the Measurement of Field Distributions", by A. J. Rogers, *Applied Optics*, Vol. 20, No. 6, pages 1060–1074, Mar. 15, 1981.) In general, the detected backscattered signal is very faint, and monitoring techniques based on OTDR or on polarization-sensitive OTDR (POTDR) require extensive time-averaging to produce a result.

Heretofore, monitoring techniques based on OTDR or on POTDR have not been recognized as being suitable for sensing the occurrence of a cyclically recurring disturbance near a localized portion of an optical fiber. In practice, such monitoring is important to detect the potential impairment of a buried optical cable by, for example, digging equipment. If the presence of a periodic vibration indicative of digging equipment in the vicinity of the cable can be detected in time to initiate some corrective action, a potentially serious disruption of communications service, due, say, to cracking or breaking of the cable, can be avoided.

In the aforecited Rogers article, the applicability of POTDR techniques to monitoring vibrational modes in the vicinity of an optical fiber is recognized. But the techniques described therein rely solely on the inducement by the vibrations of spatially distributed standing waves along the longitudinal axis of the fiber. Thus, neither the POTDR techniques of Rogers nor known OTDR/POTDR techniques are amenable to sensing the potential impairment of an optical fiber by detecting the occurrence and determining the location of particular cyclic disturbances in the vicinity of a localized portion of the cable.

Accordingly, efforts have continued by workers skilled in the art directed at trying to improve the capability of sensing techniques for optical networks. In particular, these efforts have been directed at trying to devise a reliable way of detecting the occurrence and determining the location of periodic disturbances near a localized portion of an optical cable. It was recognized that these efforts, if successful, could detect a potential impairment to the cable and thereby provide a basis for corrective action before communications service is degraded or interrupted. Such a capability would, of course, significantly improve the reliability and lower the cost of maintaining optical fiber networks.

SUMMARY OF THE INVENTION

In accordance with the principles of the present invention, cyclic disturbances in the vicinity of a localized portion of an optical fiber are sensed by detecting changes in the intensity of a particular polarization component of the light backscattered from the disturbed portion. The detection process is controlled by a timing wave whose frequency is selected to be that of the disturbance whose occurrence is to be monitored. By changing the frequency of the timing wave, the frequency of the disturbance to which the detection circuitry is sensitive is correspondingly changed.

During one half-cycle of each of several successive timing waves, multiple backscattered signals arising from a periodic disturbance having the same frequency as that of the timing wave are added together and then averaged to provide a resulting signal of one polarity. During the other half-cycle of each timing wave, multiple backscattered signals are added together and then averaged to provide a resulting signal of the other polarity. The resulting signals obtained by this synchronous detection process are then combined to provide a net signal. The magnitude of the net signal depends on the intensity of the cyclic disturbance, the number of signals averaged and the phase of the timing wave relative to that of the disturbance. Detection of such a net signal is indicative of the presence at some point along the optical fiber of a periodic disturbance having a frequency equal to that of the timing wave. The point along the cable near which the disturbance occurred is determined based on measuring the time interval between the launch of a pulse down the fiber and receipt by the detection circuitry of the corresponding backscattered signal.

Thus, in accordance with the invention, a method and apparatus are provided for sensing the occurrence and determining the location of a cyclic disturbance near a localized portion of an optical fiber. The invention comprises launching multiple spaced-apart optical pulses of a consistent polarization into one end of the fiber. Signals of a particular polarization that are backscattered from successive portions of the fiber are routed to detection circuitry coupled to the one end. The detection circuitry is synchronously controlled with a timing wave whose frequency is the same as the frequency of the cyclic disturbance to be sensed. In that way, a net signal indicative of the occurrence of any such disturbance is provided. Moreover, by measuring the time interval between the launching of the pulses and the generation of signals by the detection circuitry, a determination can be made of the location of the disturbance along the fiber.

BRIEF DESCRIPTION OF THE DRAWING

A complete understanding of the present invention and of the above and other features and advantages thereof will be apparent from the detailed description below taken in conjunction with the accompanying drawing, in which.

DETAILED DESCRIPTION

Figure 1:
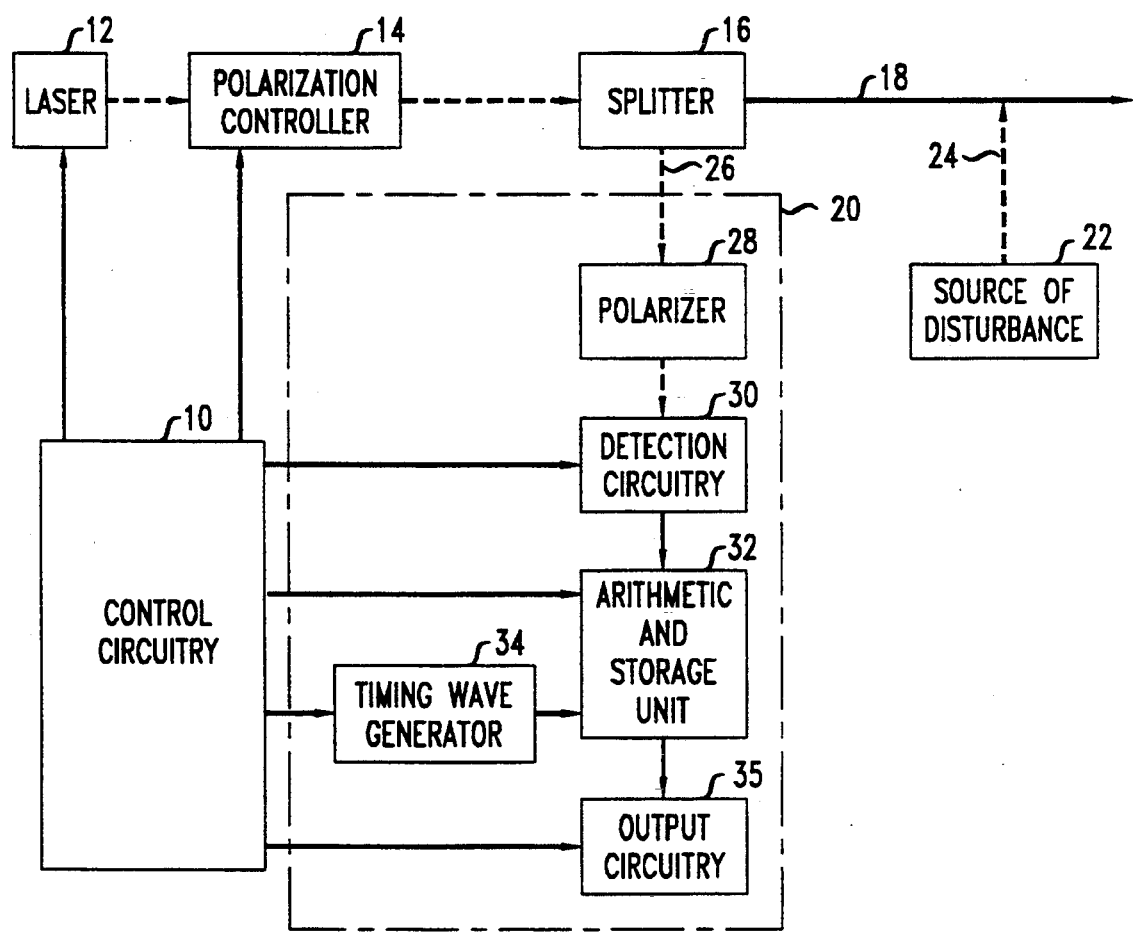
FIG. 1 is a schematic block diagram representation of a specific illustrative sensing apparatus made in accordance with the principles of the present invention.

In response to electrical timing signals applied thereto by control circuitry 10 of FIG. 1, a light source such as a conventional laser 12 is designed to emit successive spaced-apart light pulses. Herein, for illustrative purposes, the laser 12 will be assumed to be a standard unit of the type commonly used in a commercially available OTDR system.

It is not crucial that the light pulses supplied by the laser 12 of FIG. 1 exhibit any particular polarization. What is important for purposes of the present invention is that all the emitted pulses be consistently polarized, that is, that they all exhibit the same polarization state over a specified interval. Herein, it is to be understood that the term "consistently polarized" is intended to encompass both the case wherein polarization is consistent over each complete cycle (two half-cycles of a timing wave) or consistent during the entire measurement (many cycles of the timing wave).

Advantageously, in accordance with a feature of this invention, the consistently polarized pulses emitted by the laser 12 are propagated through a conventional polarization controller 14. In standard ways known in the art, the controller 14 is designed to selectively alter the polarization condition of light pulses that travel therethrough, thereby to provide output pulses that are still consistently, but differently, polarized relative to the pulses provided by the laser 12. In that way, the polarization state of light pulses to be supplied to an optical fiber can be adjusted to a state that in practice is determined to be especially sensitive to disturbances expected to occur in a localized portion of the fiber.

In turn, a portion of each light pulse supplied by the controller 14 of FIG. 1 is coupled via a standard optical splitter 16 to the input end of a conventional communications-grade single-mode optical fiber 18 made, for example of silica. Backscattered signals from the fiber, resulting from each such pulse, are routed by the splitter 16 toward a receiver unit 20, whose arrangement and function will be described in detail later below.

Advantageously, so as not to overload and perhaps damage components in the receiver unit 20 resulting from reflections in the splitter 16, detection circuitry 30 in the unit 20 is blanked or disabled by the control circuitry 10 during each time interval in which a laser pulse is being applied to the splitter 16.

For purposes only of providing a specific illustrative example of the operation of the present invention, the fiber 18 of FIG. 1 is assumed to be made of silica, buried in the ground and to have a length of ten kilometers. Hence, a pulse that is launched or coupled into the left-hand or input end of the fiber will take approximately fifty microseconds to reach the right-hand end of the fiber. And such a pulse in the form of a backscattered portion thereof will take another fifty microseconds to propagate from the right-hand end back to the input end of the fiber. Accordingly, so that the backscattered signals attributable to a particular launched pulse will not interfere with a subsequent launched pulse, the pulses applied to the input end of the fiber 18 are typically spaced apart by at least one hundred microseconds, as is well known in the art of OTDR systems.

The present invention is based on the recognition that certain phenomena in the vicinity of an optical fiber will change the polarization condition of pulses propagating through a disturbed localized section of the fiber. Specifically, a cyclically-varying phenomenon, such as a vibrational disturbance, will induce a cyclical variation in polarization. In accordance with the invention, the occurrence of such a cyclic polarization change is detected in a unique manner in which the frequency of the disturbance affecting the fiber is determined. A net signal derived from multiple backscattered signals each indicative of such a disturbance is provided by the receiver unit 20 of FIG. 1. Moreover, in accordance with standard OTDR techniques, based on the time that elapses between a launched pulse and its corresponding backscattered signal, the unit 20 also provides an indication of the location of the disturbance along the fiber.

FIG. 1 depicts a source 22 that provides a periodic disturbance in the vicinity of a localized portion of the optical fiber 18. Illustratively, the source 22 comprises digging equipment such as, for example, a back-hoe which poses a danger to the integrity of the buried fiber 18. Dash line 24 in FIG. 1 is representative of vibrations emanating from the source 22 and propagating toward the fiber 18.

Many disturbances such as vibrations caused by digging equipment exhibit a characteristic cyclic frequency. Such frequency uniqueness provides a basis for distinguishing between potentially hazardous disturbances caused by digging equipment and benign vibrational occurrences caused, for example, by a passing train. In accordance with the present invention, this frequency uniqueness is taken advantage of by carrying out in the receiver unit 20 a frequency-selective detection process that provides a high degree of discrimination between hazardous and benign occurrences.

Assume, by way of a specific illustrative example, that the source 22 depicted in FIG. 1 comprises digging equipment which, while operating, generates in the ground in the vicinity of a localized portion of the fiber 18 a vibrational disturbance having a characteristic frequency of fifty Hertz. In response to such a disturbance, the polarization state of light signals backscattered from and through the disturbed portion of the fiber 18 also varies at fifty Hertz. In other words, the intensities of the respective polarization components of each backscattered light signal passing through the disturbed portion are thereby varied relative to their quiescent or undisturbed condition, at a rate that follows the fifty-Hertz disturbance.

Quiescently, every element of the fiber 18 of FIG. 1 backscatters to the input end of the fiber some portion of each launched optical pulse propagated therethrough, and some random variations occur in the polarization state of the light. Thus, even in the absence of an anomalous disturbance along the fiber, some level of reference and noise signals arrives at the splitter 16 and is then routed in the direction of dash line 26 to the receiver unit 20.

In the receiver unit 20, a conventional polarizer 28 is adapted to pass therethrough only one specified polarization component of each backscattered signal received from the fiber 18 via the splitter 16. Thus, when the respective intensities of the polarization components of the backscattered signals are changed by a disturbance occurring along the fiber 18, the intensities of the specified polarization component appearing at the output of the polarizer 28 will change correspondingly.

The output of the polarizer 28 of FIG. 1 is applied to standard detection circuitry 30 that comprises, for example, a conventional broad-band silicon photo-diode detector unit. In turn, the output of the detection circuitry 30 is applied to an arithmetic and storage unit 32 whose mode of operation is controlled by signals applied thereto from the control circuitry 10 and a timing wave generator 34. Together, the detection circuitry 30, the unit 32 and the generator 34 perform a synchronous detection function, as described in detail later below.

The general concept of synchronous or phase-sensitive detection is well known in the art of electronics. But its particular applicability, as in the present invention, to an optical fiber network to provide a POTDR system characterized by frequency-selective detection of a periodic disturbance is unique and unobvious.

Figure 2:
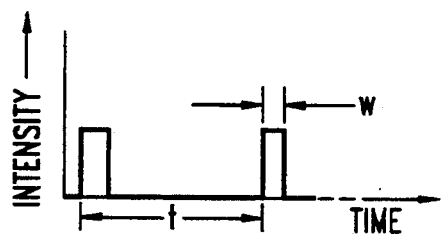
FIGS. 2 through 4 constitute a set of timing diagrams that are indicative of the mode of operation of the invention depicted in FIG. 1.

FIG. 2 represents two of a train of regularly spaced-apart optical pulses provided by the laser 12 of FIG. 1. These pulses are coupled to the input end of the fiber 18 shown in FIG. 1. Illustratively, for the aforementioned example in which the fiber 18 is ten kilometers long, the time t between launched pulses is at least one hundred microseconds. In practice, to provide a satisfactory signal-to-noise ratio, the relatively low-intensity backscattered signals from each portion of the fiber are accumulated. Thus, in one particular example, two thousand such backscattered signals attributable respectively to two thousand launched pulses are accumulated and averaged for each different portion of the fiber. Illustratively, this is done in the arithmetic and storage unit 32 by standard multi-channel recording techniques well known in the OTDR art. In accordance with such known techniques, the backscatter data from each launch pulse is resolved into independent channels according to distance down the fiber. The data for each channel is thus representative of the launched pulse after it has been influenced by a corresponding portion of the fiber.

The width of each launched pulse determines the spatial resolution of the herein-described sensing arrangement. By way of example, if the width w of each of the launched pulses represented in FIG. 2 is one hundred nanoseconds, the arrangement exhibits a capability of sensing periodic disturbances that affect portions of the fiber 18 that are spaced about ten meters apart.

Figure 3:
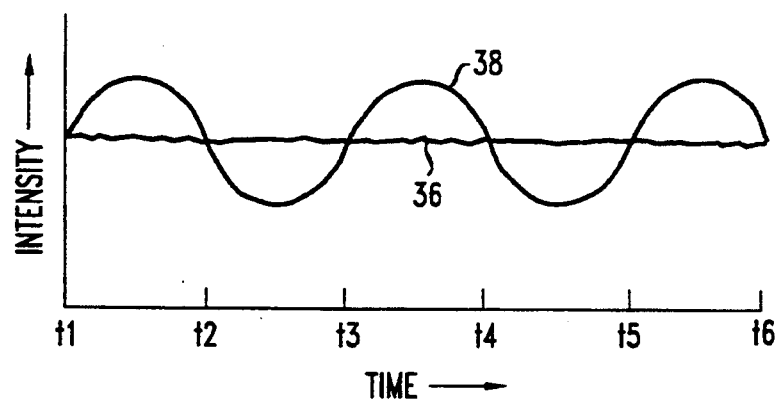

In FIG. 3, wavy line 36 represents the intensity of the reference or noise signals that are backscattered from a particular portion of the optical fiber 18 and that appear in the receiver unit 20 of FIG. 1 even in the absence of a cyclic disturbance in the vicinity of that fiber portion. Illustratively, each of the time intervals t1 to t2, t2 to t3, t3 to t4, t4 to t5 and t5 to t6 shown in FIG. 3 comprises 0.01 seconds (10,000 microseconds). Thus, during each such time interval, one hundred pulses of the illustrative type specified above and depicted in FIG. 2 are launched into the input end of the fiber 18, and the corresponding backscattered data for each fiber portion is received and accumulated in one channel of the arithmetic and storage unit 32.

Assume now that a cyclic disturbance (for example, a fifty-Hertz cyclic vibration) occurs in the vicinity of the aforementioned fiber portion. Such a disturbance affects in a cyclic manner the intensities of the respective polarization components of the signals backscattered from the disturbed portion of the fiber. Hence, the corresponding signals appearing at the output of the polarizer 28 in the receiver unit 20 of FIG. 1 also will vary in a cyclic manner representative of the vibrational disturbance.

In FIG. 3, sine wave 38 illustrates the aforementioned cyclic variation attributable to a fifty-Hertz vibrational disturbance. Thus, during the first half cycle of the wave 38 (in the interval t1 to t2), accumulating and averaging one hundred backscattered signals from the disturbed portion of the fiber would provide in the receiver unit 20 a net signal having a value that is greater than that which exists therein in the absence of a disturbance (represented by the line 36). And, similarly, during the next half cycle of the wave 38 (in the interval t2 to t3), accumulating and averaging another one hundred backscattered signals from the disturbed fiber portion would provide in the unit 20 a net signal having a value that is correspondingly less than that which exists therein in the absence of a disturbance. Hence, in a conventional process in which overall accumulating and averaging would be carried out over a number of cycles of the wave 38 (say, ten cycles), the net overall signal detected by a receiver would simply average out to a value equal to that provided by the reference or quiescent backscattered signals, that is, to a value represented by the line 36 of FIG. 3. In other words, such a conventional detection approach would be insensitive to the occurrence of a cyclic disturbance in the vicinity of an optical fiber.

Moreover, the Nyquist bandwidth of a conventional OTDR/POTDR is so low as to make it difficult in practice to resolve dynamic effects acting upon a fiber by utilizing other known detection processes. Thus, for example, a system having a ten-kilometer length of fiber, and wherein 1,500 backscattered signals are accumulated and averaged, is characterized by a Nyquist bandwidth of about three Hertz. Accordingly, standard sampling techniques were not considered to be applicable to the sensing of cyclic disturbances of the type experienced in actual optical networks.

In accordance with the principles of the present invention, a cyclic disturbance of the type represented by sine wave 38 at FIG. 3 is sensed in a unique manner in the receiver unit 20 of FIG. 1 by synchronous detection techniques. In particular, the detection process is controlled by a timing wave whose frequency is selected to be equal to that of a disturbance expected to be encountered at some point along the fiber 18 of FIG. 1. Alternatively, the frequency of the timing wave can be varied or swept over a range that encompasses a set of frequencies respectively representative of a variety of different disturbances considered likely to be encountered along a fiber. Or, by sweeping the frequency of the timing wave, the various frequency components, and thus the particular character, of a disturbance can be ascertained.

Figure 4:
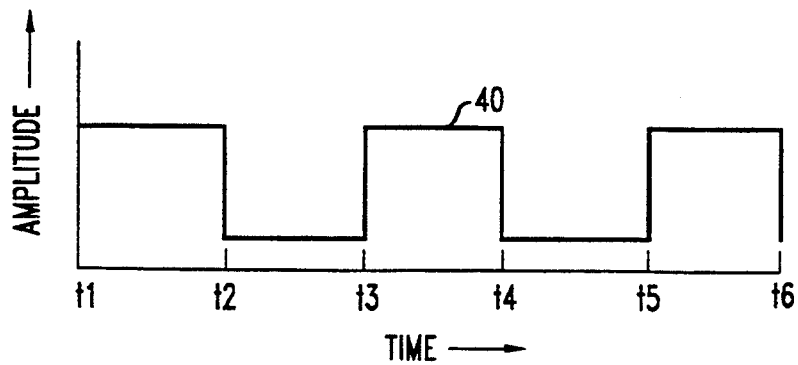

By way of a specific illustrative example, the timing wave provided by the generator 34 of FIG. 1 is of the form depicted in FIG. 4. As shown, rectangular timing wave 40 is selected to have the same frequency as that of the wave 39 (FIG. 3) which, as specified above, is representative of a disturbance to be detected. For the particular case in which the disturbance to be detected has a frequency of fifty Hertz, as represented by the wave 38, the frequency of the timing wave 40 is also adjusted to be fifty Hertz.

For purposes of a particular example, the waves 38 and 40 depicted in FIGS. 3 and 4, respectively, are shown as being in phase with each other. This in-phase relationship of the waves 38 and 40 will produce the maximum indication of a disturbance that has the same frequency as that of the timing wave 40. But any phase relationship other than exactly ninety degrees out-of-phase will produce a signal. In practice, the phase relationship can be adjusted to maximize the presence of any signal. Alternatively, in accordance with known signal processing techniques, the wave 40 can be sequentially shifted in phase ninety degrees from its initial setting, and the resulting signals combined. In other words, methods are known in the art for extracting a signal in the presence of a disturbance regardless of the phase relationship between the waves 38 and 40.

Also, it is noted that some cyclic disturbances such as those caused by digging machinery tend in practice to occur in bursts due, for example, to idling or stopping of the machinery from time to time. In those cases, the probability is extremely small that a ninety-degree-out-of-phase condition will persist over an extended monitoring interval.

During the time interval t1 to t2 indicated in FIG. 4, a positive-going portion of the timing wave 40 is applied to the arithmetic and storage unit 32 of FIG. 1. In response thereto, the unit 32 is controlled during that interval to add together and then average the multiple backscattered signals supplied thereto by the detection circuitry 30. For the particular illustrative case assumed above, in which a portion of the ten-kilometer-long fiber 18 is being disturbed by a cyclic vibration of the type represented by the wave 38 of FIG. 3, one hundred such backscattered signals would be added and averaged to provide a positive signal. The value of this positive signal, which is temporarily stored in the unit 32, is greater than that which is obtained in the absence of a disturbance, when only backscattered signals represented by the reference line 36 of FIG. 3 are received by the detection circuitry 30 of FIG. 1.

Next, during the time interval t2 to t3, a negative-going portion of the timing wave 40 of FIG. 4 is applied to the unit 32 of FIG. 1. In response thereto, the unit 32 is controlled during that interval to add together, average and then impart a negative sign to the value obtained thereby. The absolute value of the resulting negative signal, which is also temporarily stored in the unit 32, is less than that which is obtained in the absence of a disturbance.

Under control of the timing wave 40, successive positive and negative signals are generated in the unit 32 in the particular manner described above. Accumulating more such signals will tend to improve the sensitivity of the apparatus to the expected disturbance and decrease the level of noise. The number of prescribed cycles of the timing wave 40 over which such signals are accumulated is determined on the basis of such factors as the amplitude of the disturbances to be detected, the length and particular characteristics of the fiber whose condition is being monitored and the sensitivity of the detection circuitry. In one illustrative example, an adequate signal-to-noise ratio is achieved by carrying out such accumulation over ten complete cycles of the timing wave 40.

After a prescribed number of cycles of the timing wave 40, the accumulated positive and negative signals described above are combined in the unit 32 to provide a net positive signal. In turn, this net positive signal is applied to the output circuitry 35 where, if the signal exceeds some predetermined threshold value, the signal is, for example, effective to trigger an alarm in the circuitry 35. Activation of the alarm indicates that a potentially hazardous disturbance, having a frequency the same as that of the timing wave 40, is occurring along the fiber 18.

Moreover, since the output circuitry 35 is timed by the control circuitry 10 in synchronism with launching of pulses by the laser 12, it is a straightforward matter, in accordance with standard OTDR techniques, to translate the time lapse between launch and receipt of a net positive signal into an indication by the circuitry 35 of the location along the fiber of the detected disturbance. In turn, remedial action can often be taken in time to prevent the disturbance from actually deleteriously affecting the fiber. Or, if alternate routes for traffic are available, the disturbed fiber can be immediately removed from active service while the nature of the disturbance is evaluated. In either case, the integrity of the network is thereby maintained.

As noted above, the waves 38 and 40 of FIGS. 3 and 4, respectively, have the same frequency of repetition. For this condition, positive and negative signals accumulate to provide, after a number of cycles of the timing wave, a net positive signal, as described in detail above. For all other frequencies of the wave 38, different from that of the timing wave 40, the values of the accumulated signals derived from the waves 38 and 40 will tend toward zero. Thus, it is apparent that, in response to disturbances occurring along the fiber 18, a net signal will be provided during the synchronous detection process carried out by the receiver 20 only for those disturbances having a frequency identical to that of the timing wave 40.

Figure 5:
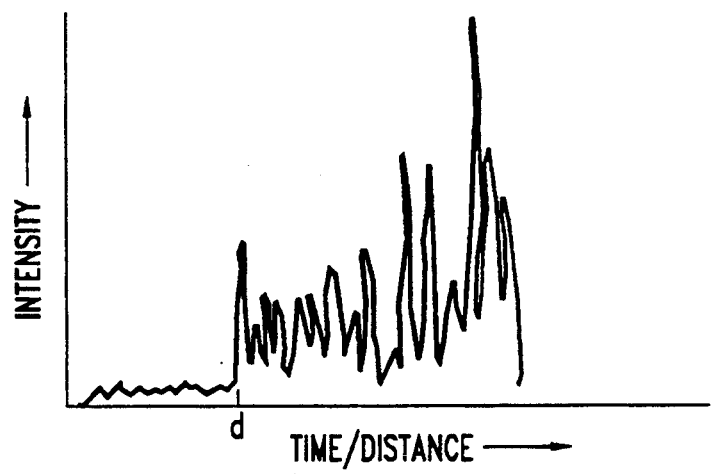
FIGS. 5 through 7 illustrate the frequency-selective nature of the synchronous detection process that is characteristic of the present invention.
Figure 6:
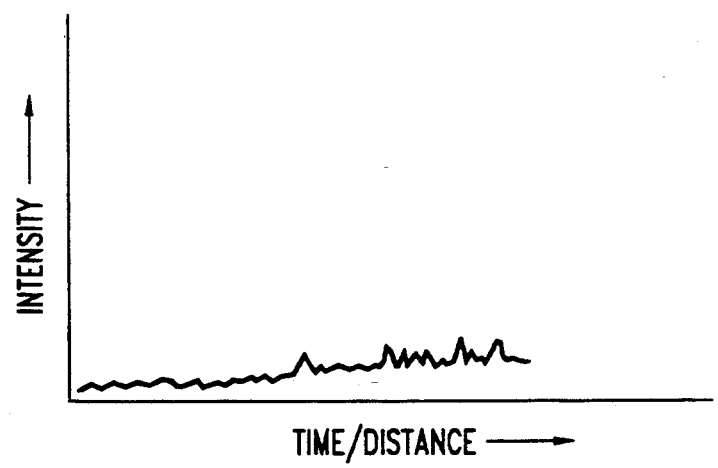
Figure 7:
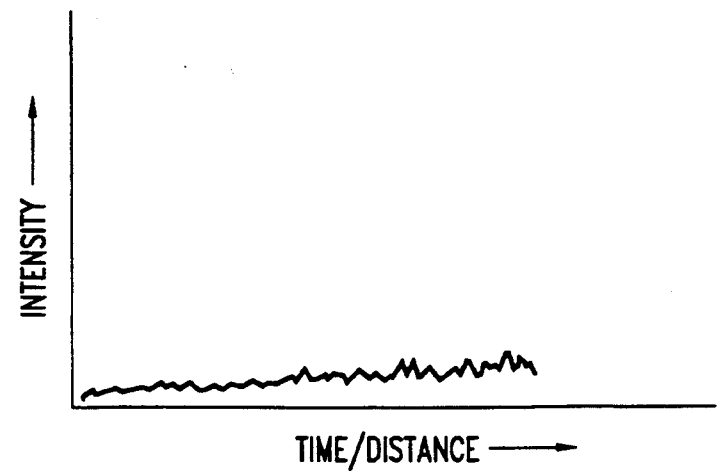

The frequency-selective nature of the synchronous detection process described herein is represented by FIGS. 5 through 7. FIG. 5 depicts a particular illustrative case in which a cyclic vibrational disturbance characterized by a frequency of forty Hertz was actually located in the vicinity of a fiber portion at a distance d from the input end of the optical fiber 18 of FIG. 1. In accordance with the principles of the present invention, synchronous detection was carried out in the receiver unit 20 under control of a timing wave also having a frequency of forty Hertz. As indicated in FIG. 5, a relatively large positive signal indicative of a disturbance was provided after launching multiple pulses into the fiber and processing the resulting backscattered signals in the inventive manner described above. As shown in FIG. 5, the first appearance of this relatively large positive signal occurs at a time corresponding to the distance d along the fiber. Subsequent relatively large signals indicated in FIG. 5 arise from the fact that a disturbance at d affects the observed polarization condition of the backscattered signals returning from every portion farther along the fiber.

FIG. 6 represents the corresponding result that occurs when the forty-Hertz disturbance continues to affect the fiber but the frequency of the timing wave that controls the synchronous detection process is changed to thirty-five Hertz. The significant difference between the detection capability at forty Hertz (FIG. 5) and thirty-five Hertz (FIG. 6) is apparent. This unequivocally confirms the frequency-selective capability of the herein-described detection system.

And, lastly, FIG. 7 shows the nature of the detected reference or noise signal that is generated in the receiver unit 20 of FIG. 1 when no disturbance is present along the fiber but the frequency of the timing wave that controls the synchronous detection process remains at forty Hertz. The close similarity between the low-intensity plots of FIGS. 6 and 7 and their marked difference from the disturbance-indicating plot of FIG. 5 are evident.

Finally, it is to be understood that the above-described arrangements and techniques are only illustrative of the principles of the present invention. In accordance with these principles, numerous modifications and alternatives may be devised by those skilled in the art without departing from the spirit and scope of the invention. Thus, for example, although primary emphasis herein has been directed to sensing vibrational disturbances in communications fibers, it is apparent that the principles of this invention are applicable to the sensing of any cyclic disturbance that either directly or through the use of a transducer affects the polarization condition of a localized portion of an optical fiber. Illustratively, a detection arrangement of the type described herein is well suited for sensing vibrational disturbances in the field of seismology.

Also, it is apparent that a variety of other specific arrangements and techniques may be employed in the detection process. Thus, for example, the light source 12 or the detection circuitry 30 may be controlled by the timing wave 40 to establish the positive and negative signals that are then combined. Further, the polarizer 28 and the beam splitter 16 may be combined in a single polarizing beam splitter unit.

What is claimed is:

1. Apparatus for sensing the occurrence of a disturbance in the vicinity of a localized portion of an optical fiber, said apparatus comprising
    means for applying multiple spaced-apart consistently polarized optical pulses to the input end of said fiber, and
    means for synchronously detecting optical signals of a particular polarization that are backscattered from said localized portion to said input end,
    wherein said synchronous detection is carried out at a frequency that is equal to the frequency of said disturbance.

2. Apparatus for remotely sensing the occurrence and determining the location of a cyclic disturbance in the vicinity of a localized portion of an optical fiber, said apparatus comprising
    means for applying to an input end of said fiber multiple spaced-apart optical pulses that are consistently polarized,
    means coupled to said input end and responsive only to signals of a particular polarization that are backscattered from said localized portion of said fiber for providing multiple spaced-apart backscattered signals of said particular polarization, said multiple backscattered signals varying in intensity above and below a reference intensity level in correspondence with the frequency of a disturbance affecting said localized portion,
    means responsive to the output of said last-mentioned means for separately processing respective excursions of backscattered signal intensity levels above and below said reference level to provide a net output signal indicative of the occurrence of a disturbance, said separate processing occurring at a frequency that is equal to the frequency of said cyclic disturbance, and
    means responsive to the time lapse between signals applied to said fiber and the providing of said net signal for indicating the location of a cyclic disturbance along said fiber.

3. Apparatus as in claim 2 wherein said optical fiber comprises a single-mode communications-grade optical fiber.

4. Apparatus as in claim 3 wherein said means for applying pulses to said fiber comprises a laser.

5. Apparatus as in claim 4 further including a polarization controller interposed between said laser and the input end of the fiber.

6. Apparatus as in claim 5 still further including a splitter interposed between said polarization controller and the input end of said fiber, said splitter having one output that is connected to the input end of said fiber and a second output that is connected to said means responsive only to signals of a particular polarization.

7. Apparatus as in claim 6 wherein said means responsive only to signals of a particular polarization comprises a polarizer.

8. Apparatus as in claim 7 wherein the output of said polarizer is connected to detection circuitry.

9. Apparatus as in claim 8 further including control circuitry connected to said detection circuitry for disabling said detection circuitry during the respective time periods in which pulses are applied by said laser to said fiber via said polarization controller and said splitter.

10. Apparatus as in claim 9 wherein the output of said detection circuitry is connected to an arithmetic and storage unit.

11. Apparatus as in claim 10 wherein a timing wave generator is connected to said arithmetic and storage unit for controlling the operation of said unit.

12. Apparatus as in claim 11 wherein the frequency of the wave provided by said timing generator to control the operation of said arithmetic and storage unit is equal to the frequency of said disturbance to be sensed.

13. A method for sensing the occurrence of a disturbance in the vicinity of a localized portion of an optical fiber, said method comprising the steps of
    applying multiple spaced-apart consistently polarized optical pulses to the input end of said fiber, and
    synchronously detecting signals of a particular polarization that are backscattered from said localized portion to said input end,
    wherein said synchronous detection is carried out at a frequency that is equal to the frequency of said disturbance.

14. A method as in claim 13 further including the step of detecting the location of said disturbance by measuring the time interval between the application of pulses to the input end of said fiber and the receipt of said backscattered signals.

* * * * *